Jan. 1, 1929.
D. F. YOUNGBLOOD
SPEAKING DEVICE
Filed May 18, 1928  2 Sheets-Sheet 1
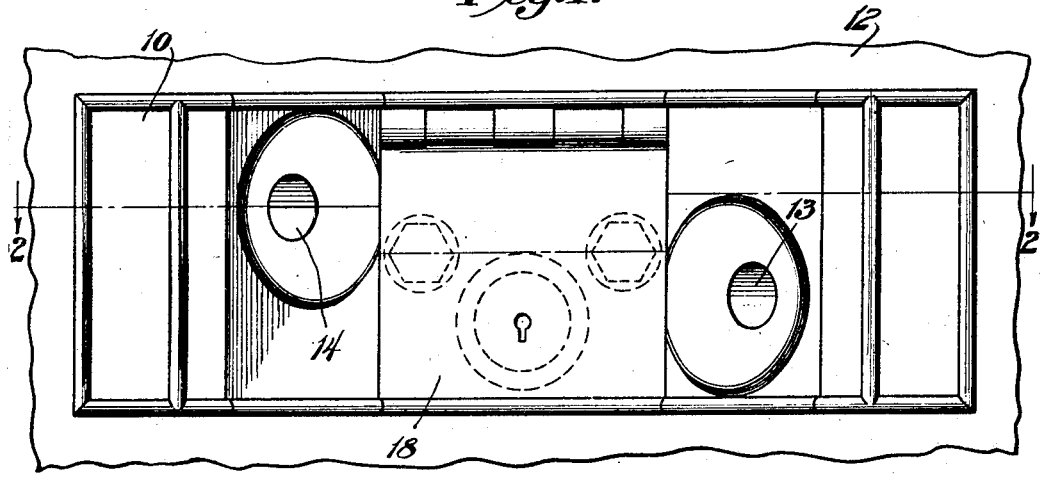
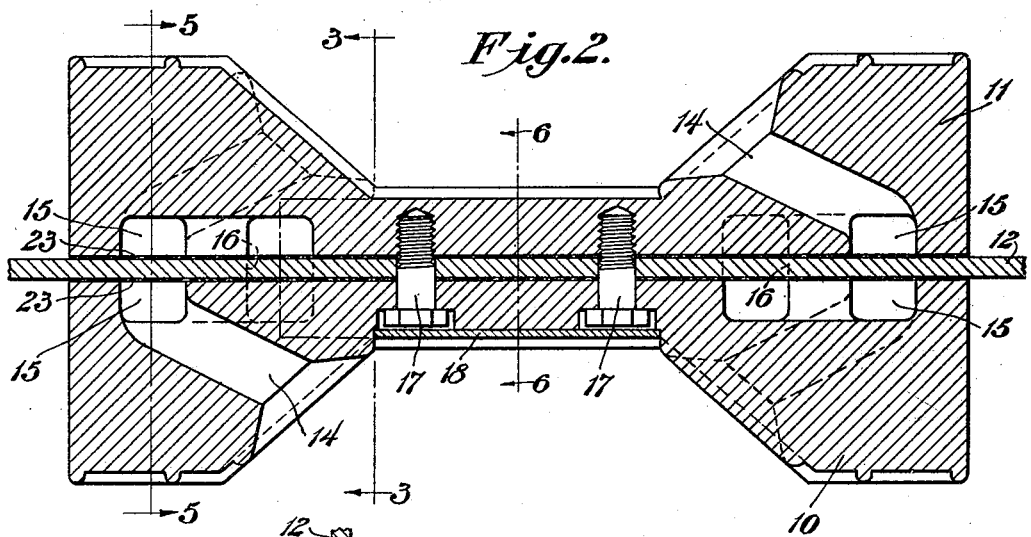
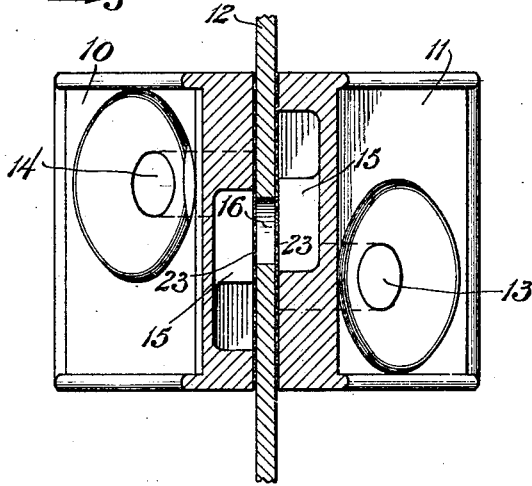
INVENTOR
D. F. Youngblood,
BY
Diggers + Adams
ATTORNEYS Jan. 1, 1929.   1,697,446
D. F. YOUNGBLOOD
SPEAKING DEVICE
Filed May 18, 1928   2 Sheets-Sheet 2
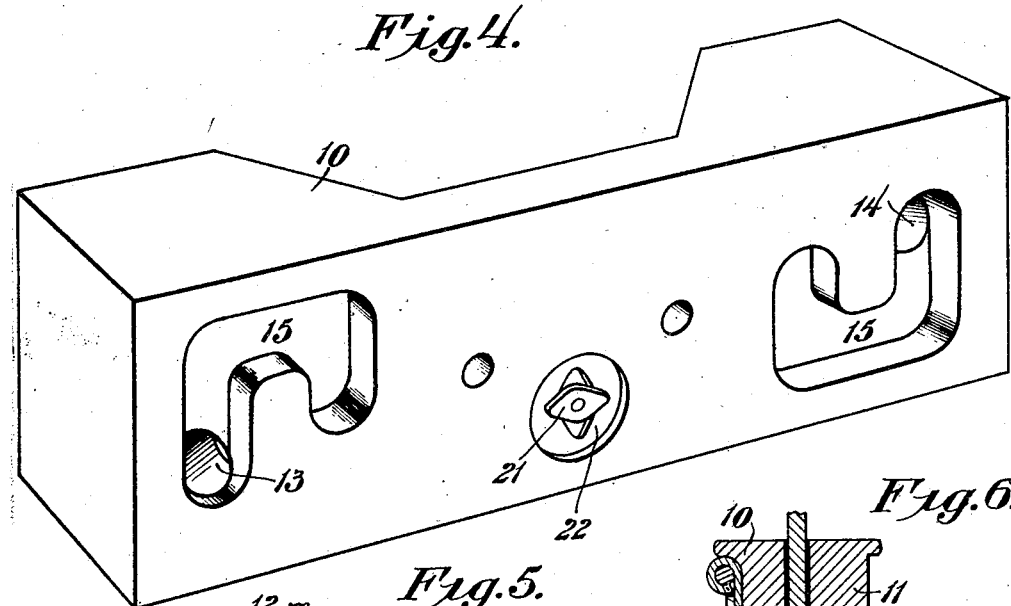
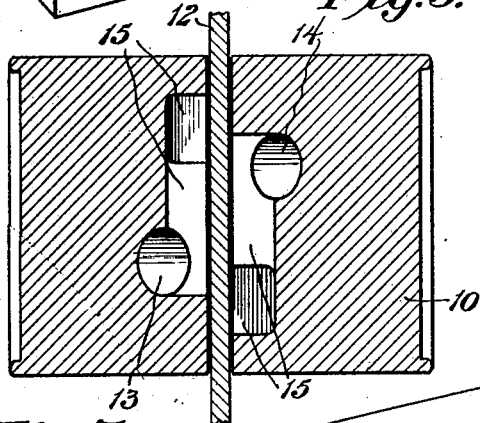
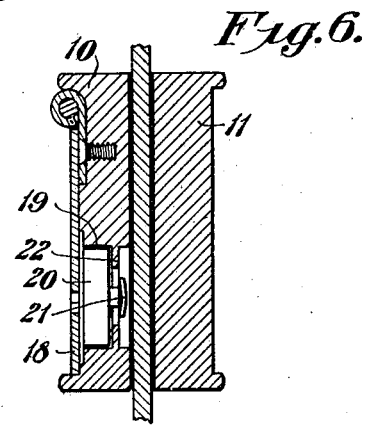
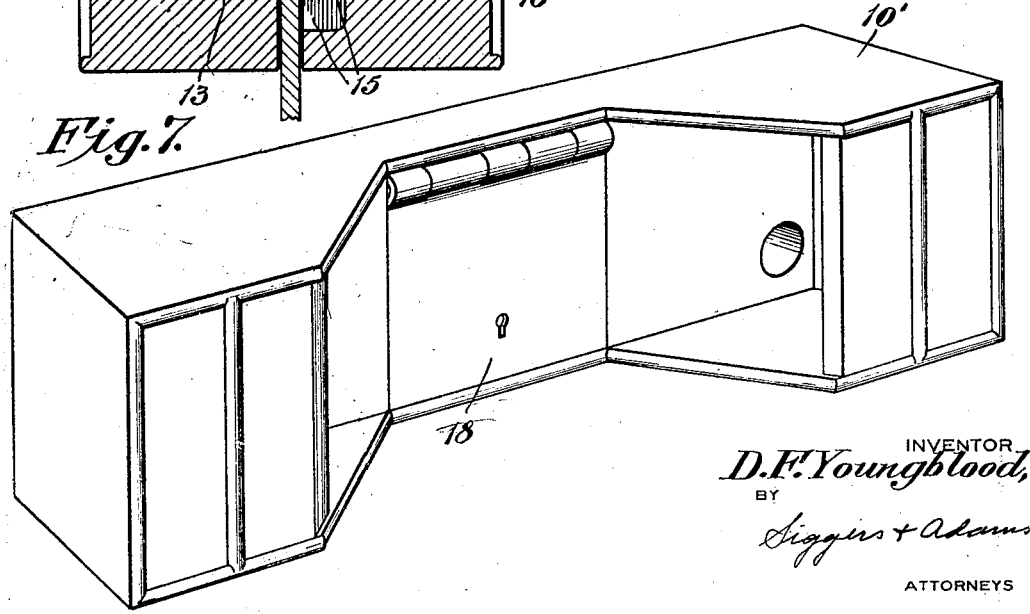
INVENTOR
D. F. Youngblood,
BY
ATTORNEYS Patented Jan. 1, 1929.

1,697,446

UNITED STATES PATENT OFFICE.

DAVID F. YOUNGBLOOD, OF SAN ANTONIO, TEXAS.

SPEAKING DEVICE.

Application filed May 18, 1928. Serial No. 278,875.

This invention relates to speaking devices for jails and the like and aims, among other objects to provide an improved speaking tube attachment for a jail wall constructed and arranged to permit a prisoner to carry on a conversation with a visitor and to prevent the passage of any article from one to the other.

Further, it aims to produce a device so constructed that the communicants can easily talk and listen while holding their heads in one position. Also, the device is capable of being removed from the cell wall so that any contraband notes or the like which are attempted to be passed through the speaking or listening openings may be cleaned out from time to time.

Referring to the accompanying drawings;

Fig. 1 is a side elevation of one preferred form of the speaking device showing it applied to a metal cell wall;

Fig. 2 is a sectional view taken on the line 2—2 of Fig. 1;

Fig. 3 is a sectional view taken on the line 3—3 of Fig. 2;

Fig. 4 is a perspective view of that portion of the speaking device which is adapted to be secured to the outside of the jail wall;

Fig. 5 is a sectional view taken on the line 5—5 of Fig. 2;

Fig. 6 is a sectional view taken on the line 6—6 of Fig. 2 and

Fig. 7 is a perspective view showing a slightly modified form of speaking device embodying the invention.

Referring particularly to the accompanying drawings, the preferred embodiment of the invention there shown comprises a pair of block-like members 10 and 11 adapted to be secured opposite from each other on a wall 12 of a jail and each of the members is shown as having a speaking opening 13 and a listening opening 14, each communicating with the other through a circuitous passageway leading through an opening in the wall.

Referring to Figs. 1 and 2, each of the block-like members is shown as having the speaking and listening openings 13 and 14, which conveniently may be in the form of an ear or mouthpiece, arranged in an inclined face of the block, two such faces being shown and being outwardly diverging. The space between the two inclined faces having the mouth and ear pieces or rosettes is such as to accommodate the face of a communicant and, as will be noted in Fig. 1, the mouth opening 13 is somewhat below the level of the listening opening 14 so that when a communicant is talking, it is not necessary for him to move his ear to have it in the right position, to hear the response. Moreover, when the communicants are conversing, they may place their mouths and ears closely in the flaring recessed openings so that the sounds will be muffled and thus they will have more or less privacy.

Referring to Figs. 2 and 4, it will be noted that each speaking opening communicates with the opposite listening opening through a tortuous or circuitous path. Herein, the faces of the block-like members are provided with substantially U-shaped recesses 15, suitably formed in the casting, assuming that the blocks are made of some suitable cast metal. One end of the U-shaped recesses communicates with a speaking opening or listening opening as the case may be and the other end of the other leg of the U-shaped recesses is adapted to register with a suitable opening 16 in the cell wall. Due to the different elevation of the speaking and listening openings, it will be seen that the recesses in the backs of the blocks are so arranged that the openings do not come in alinement, thus making it extremely difficult for anyone to push any article through the openings from one side to the other.

The two block members 10 and 11 may be secured to cell wall 12 in a great variety of ways. In the present example, however, the relatively thin portions of the members between the mouth and ear pieces are shown as having bolt holes to receive suitable securing bolts 17, the member 11 being tapped so that the bolts do not project through it where they can be tampered with by the prisoner. Conveniently the bolts may be of such character as to be screwed in place by means of a socket wrench or screw driver and the holes in the outer block member 10 are shown as being countersunk to receive the heads. Referring to Fig. 2, it will be seen that the arrangement is such that the two bolts 17 there shown pass through suitable openings in the wall 12 and hold the block members in such position that the sound openings of passageways register with each other.

To prevent a visitor from tampering with the bolts 17 and removing the block members from the cell wall, there is shown a hinged cover plate 18 (Figs 1, 2, 6 and 7) adapted to be locked down over the bolt heads in the space between the speaking and listening openings in the block member 10. Herein, the block member 10 is shown as having a recess 19 to receive the door lock 20 which has an elongated rotatable latch 21 to cooperate with an opening in a web 22. This door may be locked in closed position by any suitable lock and key.

To obviate the passage of any article, however small it may be, through the sinuous sound passages, a foraminous plate or sheet 23 may be interposed between the wall 12 and each of the block-like members in somewhat the same fashion as an ordinary gasket. Conveniently, these foraminous plates or sheets may be fine mesh screen wire or the like, the idea being to cover the sound openings in the wall 12. Obviously, if a small piece of wire having a wad of some material on its end is pushed through the passages, these foraminous sheets will act as barriers for the wad.

One or both of the block members may assume a great variety of shapes so as to make it convenient for a communicant to so place his head as to speak and listen without having to move. In Fig. 7 there is shown a slightly modified form of block member 10′ wherein the rosettes providing the speaking and listening tubes are omitted and the end or pillar portions of the block member are made hollow. The main portion of the block member there shown is of substantially uniform thickness and the speaking and listening openings are drilled or bored adjacent to the opposite ends opening into the hollow box-like portions which serve as sounding horns to amplify the voice.

To install the speaking device herein described on an existing metal wall, it is only necessary to provide four openings in the wall; two for the sound passages and two for the bolts. If the metal wall is of tool-proof steel such as is used in jail construction, these openings may easily be made by using an acetylene torch or the like. It is desirable although not indispensable to place the speaking device below a steel window so that the communicants may see each other while they are conversing.

Past experience has demonstrated that visitors are prone to deliver various articles to prisoners or inmates of cells and that they will resort to any means to accomplish this end. Hence, it is anticipated that any speaking devices having openings will eventually become clogged with various articles. The speaking device here described may be very easily removed from the wall by the jail keeper so that any contraband articles may be recovered from the sound passageways and the visitor may be apprehended. It is only necessary for the jailer or jail keeper to unlock the door or hinged plate 18 and remove the two bolts 17 in order to remove the two block members. This may be done very quickly and the block members may be replaced after they are cleaned out.

From the foregoing description, it will be seen that the speaking device may be made very easily of cast metal and that it consists of only two relatively simple, major parts. Tests of such speaking devices have demonstrated that communicants may carry on a whispering conversation and hear each other very distinctly. Hence, it has the very decided advantage of giving the communicants the privacy which is much desired in many instances.

While the preferred embodiment of the invention is shown as including a pair of separate cast metal blocks, it is distinctly understood that the sinuous speaking passages may be embodied in a single block or in several parts secured together and inserted as a unit in a wall. Moreover, the device, as a whole may assume a great variety of shapes.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A speaking device for jails and the like comprising, in combination, a pair of block-like members detachably secured on opposite sides of a wall, said members each having spaced circuitous speaking and listening openings passing through the wall.

2. A speaking device for jails and the like, comprising in combination, a pair of metal, block-like members secured to the opposite sides of a wall; diverging faces on the block members; and speaking and listening openings through said block members and through the wall terminating in said diverging faces.

3. A speaking device for jails and the like, comprising in combination, a pair of block-like members detachably secured on opposite sides of a wall; said members each having spaced, circuitous, speaking and listening openings passing through the wall and the listening opening through each of them being arranged above the speaking opening so that it lies adjacent to the ear of the communicant while the mouth is held adjacent to the speaking opening.

4. A speaking device for jails and the like comprising, in combination, a pair of block-like members secured to the opposite sides of a wall; speaking and listening openings passing through the block members and through the wall adjacent to the opposite ends thereof; and a foraminous sheet interposed between one of said block members and the wall whereby to provide a barrier to prevent the passage of any small articles through said openings.

5. A speaking device for jails and the like comprising, in combination, a pair of cast metal members having tortuous speaking and listening openings secured to the opposite sides of a wall; said speaking and listening openings terminating in mouth and ear pieces so arranged as to come adjacent to the mouth and ear of a communicant.

6. A speaking device comprising, in combination, a pair of block-like, cast metal members detachably secured on opposite sides of a jail wall, enlarged portions at the opposite ends of said block-like members presenting diverging faces; and speaking and listening openings passing through said block-like members and through the jail wall terminating in mouth and ear pieces in said diverging faces.

7. A speaking device for jails and the like, comprising in combination, a pair of block-like members having complemental speaking and listening openings arranged for two-way conversation between a prisoner or inmate and a visitor; means for securing said members together on opposite side of the jail wall; and a cover member adapted to be locked over said securing means and arranged to prevent a communicant from tampering with the securing means.

8. A speaking device for jails and the like comprising, in combination, a pair of block-like members having complemental speaking and listening openings arranged for two-way conversation between a prisoner or inmate and a visitor; means for securing said members together on opposite sides of the jail wall; and a hinged cover member having a lock cooperating with one of said block-like members arranged to be locked over said securing means to prevent a communicant from tampering with the securing means.

9. A speaking device for jails and the like comprising, in combination, a pair of block-like members having complemental speaking and listening openings; said members having alined bolt openings; the bolt openings in one of said members being screw threaded and the bolt openings in the other of said members being countersunk to receive the heads of securing bolts; a hinged cover plate on said member having the countersunk openings, arranged to cover the bolt heads; and a lock for locking the cover plate over the bolt heads to prevent a communicant from tampering with the bolts.

10. A speaking device of the character described, having horizontally spaced speaking and listening openings for each communicant, said device having sound conducting passages each connecting a speaking opening with a listening opening; each speaking opening being below the corresponding listening opening; and the sound passages being sinuous to prevent the passage of articles from one side of a wall to the other.

In testimony, that I claim the foregoing as my own, I have hereto affixed my signature.

DAVID F. YOUNGBLOOD.